No. 725,289. PATENTED APR. 14, 1903.
J. C. SCHREDER.
SILO.
APPLICATION FILED MAY 19, 1902.
NO MODEL. 2 SHEETS—SHEET 1.

Witnesses
Inventor
John C Schreder
By
Attorneys

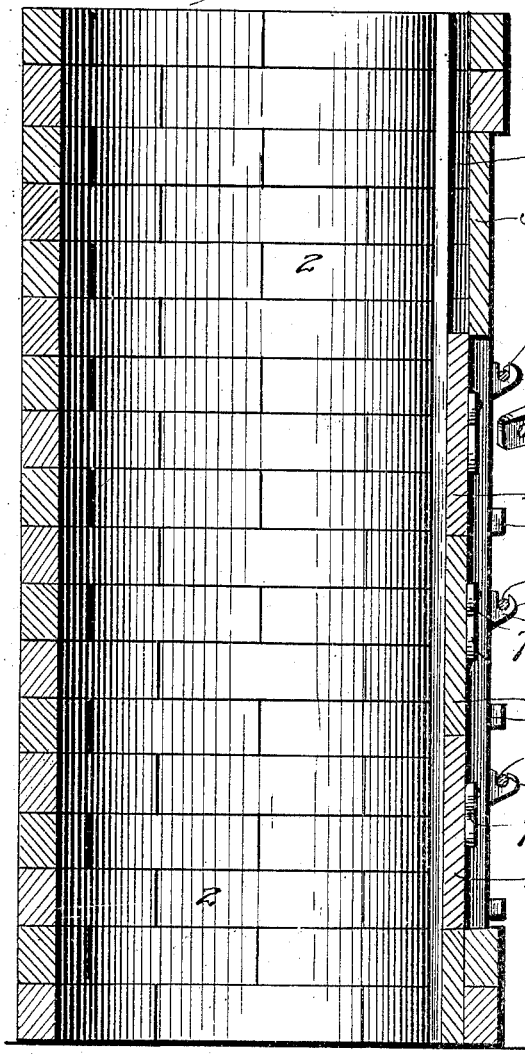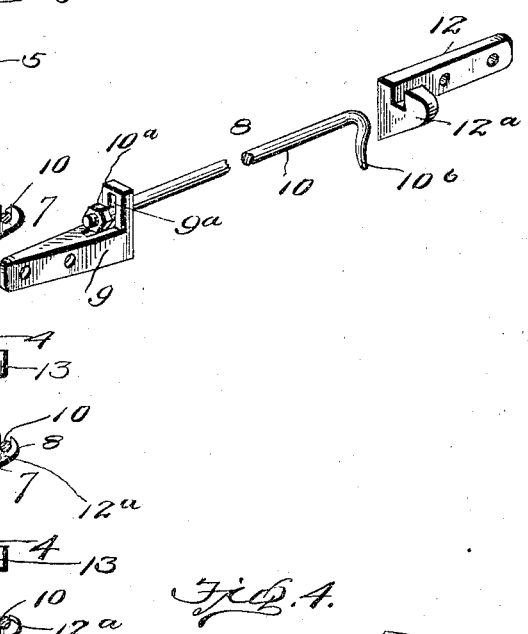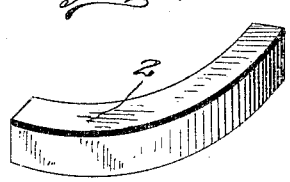

UNITED STATES PATENT OFFICE.

JOHN C. SCHREDER, OF TECUMSEH, MICHIGAN.

SILO.

SPECIFICATION forming part of Letters Patent No. 725,289, dated April 14, 1903.

Application filed May 19, 1902. Serial No. 107,938. (No model.)

*To all whom it may concern:*

Be it known that I, JOHN C. SCHREDER, a citizen of the United States, residing at Tecumseh, in the county of Lenawee and State of Michigan, have invented certain new and useful Improvements in Silos; and I do declare the following to be a full, clear, and exact description of the invention, such as will enable others skilled in the art to which it appertains to make and use the same.

The invention relates to silos for preserving fodder and other food-stuffs for cattle.

The object of the invention is to provide a silo which will be air-tight at all times and which will thoroughly cure and preserve the food placed therein.

A further object is to provide a silo which will be simple and easy to build, comparatively inexpensive, convenient to fill and to take from as needed, and which can be readily built onto at any time should a larger structure be necessary.

With these and other objects in view the invention consists of certain novel features of construction, combination, and arrangement of parts, which will be hereinafter more fully described, and particularly pointed out in the appended claim.

Figure 1:
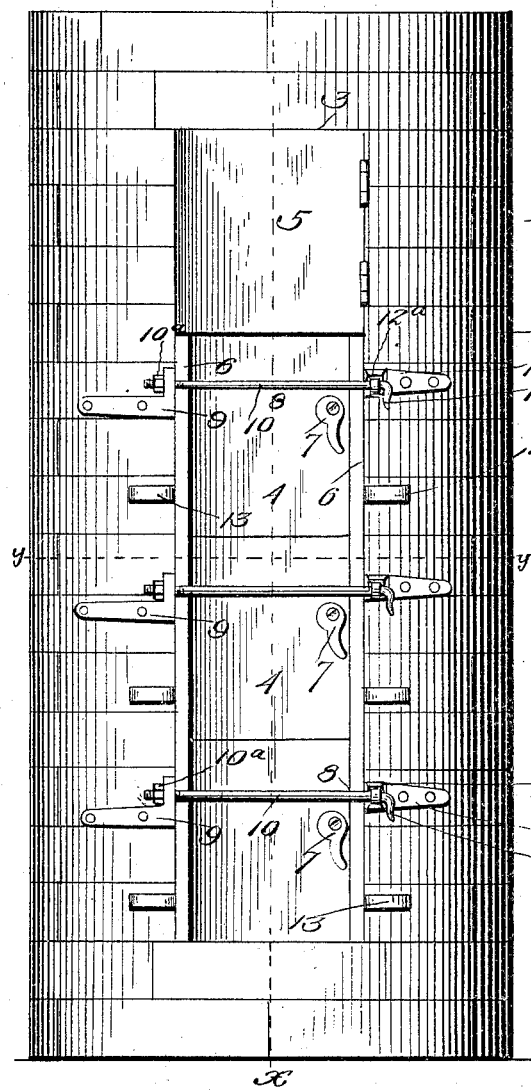
Figure 3:
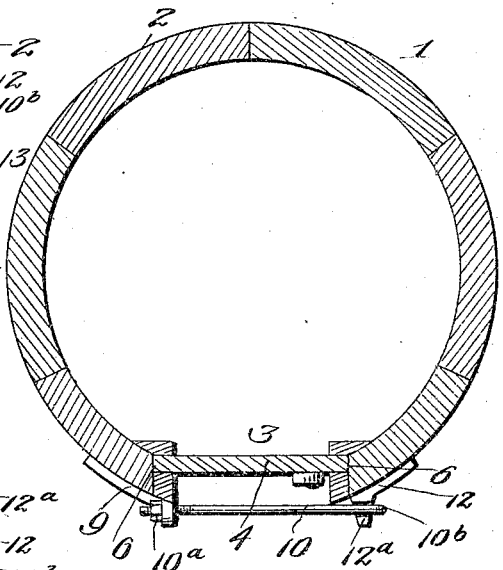

In the accompanying drawings, Figure 1 is a front elevation of the silo. Fig. 2 is a central vertical section on line $x\,x$ of Fig. 1. Fig. 3 is a horizontal sectional view on line $y\,y$ of Fig. 1. Fig. 4 is a detail perspective view of one of the building-segments, and Fig. 5 is a similar view of one of the tie-bolt latches detached.

In the drawings, 1 denotes the structure, which is preferably circular or cylindrical in shape and which may be of any desired diameter and height.

2 denotes the blocks or sections which compose the walls of the structure. These blocks are of segmental or curvilinear form and are adapted to be laid up one upon the other, so as to break joints, as shown.

3 denotes an opening formed in the side of the silo and extending from near the lower end of the structure to within about two feet of the top. This opening is adapted to be closed by a series of sliding doors 4, arranged one above the other between the side walls of the opening, and by an upper swinging door 5, hinged to one of the said walls.

The doors 4 are adapted to slide in ways 6, formed on the side walls of the opening 3, and are held in their raised position by means of pivoted cam-levers 7 engaging one wall of the opening 3.

8 denotes what I shall term "tie-bolt latches," consisting of a bracket 9, bolted to one side of the opening 3 and formed on its outer end with a right-angular upwardly-projecting lug provided with a slot or opening $9^a$.

10 denotes a tie-bolt threaded at one end and to receive a nut $10^a$ and provided at the opposite end with a hook $10^b$.

12 denotes a keeper-plate bolted to the opposite side of the opening 3 and is provided with an angular slotted projection $12^a$ to receive the hook $10^b$ of the bolt 10, which is normally in engagement therewith and when in this position prevents any tendency of the walls of the opening 3 to spread and securely braces the entire structure. The nuts $10^a$ are screwed upon bolts 10 when necessity requires it, due to wear or shrinkage of the parts, so that the structure may be kept taut at all times and under all conditions. One of these tie-bolt connections is provided for each sliding door, and when the door adjacent to any bolt is to be used this bolt is unhooked and thrown back out of the way while this particular doorway is in use. These tie-bolts besides being for the purpose just described are used also for a ladder in climbing the structure, and additional footholds in the shape of blocks 13 are bolted to the walls of the silo between the bolts.

In building the silo the blocks 2 are laid in a circular position one upon the other, each being nailed through to the ones below it in such positions that they will break joint, thus affording a strong compact structure and obviating the necessity of binding-hoops or vertical braces. Furthermore, this structure may be built without the use of scaffolding, for being constructed from the inside it may be laid up as it is being filled, the ensilage forming a foundation on which the builder may stand while working, the filling and building being carried on together. A roof may be provided, if desired, and constructed in any desired manner and of any suitable material; but as this is not a necessary or important feature I have not shown the same in the drawings.

In use when it is desired to remove the contents the upper hinged door is opened and the quantity of ensilage desired for use is taken out. When all that can be conveniently reached from this door has been removed, the next door below is raised to fill the space formerly occupied by the swinging door, when more ensilage is removed until the next door is reached. This door is then slid upwardly to the position formerly occupied by the door above it, and so on until the entire contents of the silo have been removed. Thus it will be seen that at no time during the removal of the ensilage has a larger space than one door been opened, and when it is desired to refill the silo the doors are alternately lowered as the pile is being increased until the entire space is filled.

From the foregoing description, taken in connection with the accompanying drawings, the construction, mode of operation, and advantages of the invention will be readily understood without requiring an extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

A silo having a vertical doorway in one side, brackets on its outer side projecting outwardly therefrom and on opposite sides of the doorway, the brackets on one side of the doorway having horizontal openings, and those on the other side thereof having vertical slots open at their upper ends, and tie-bolts disposed transversely across and in front of the doorway and having hooked ends adapted to be inserted in and unshipped from the vertical slots of the slotted brackets, the opposite ends of said tie-bolts being extended through the openings in the brackets on the other side of the doorway and provided with taps, substantially as described.

In testimony whereof I have hereunto set my hand in presence of two subscribing witnesses.

JOHN C. SCHREDER.

Witnesses:
GARLAND R. GILLESPIE,
WILLIAM GASTON.